United States Patent [19]

Le Clercq

[11] Patent Number: 5,138,653
[45] Date of Patent: Aug. 11, 1992

[54] SYSTEM FOR AUTOMATIC NOTIFICATION OF THE RECEIPT OF MESSAGES IN AN ELECTRONIC MAIL SYSTEM

[76] Inventor: Patrick Le Clercq, 381 avenue de la Forêt de Soignes, 1640 Rhode-Saint-Genèse, Belgium

[21] Appl. No.: 466,314
[22] PCT Filed: Sep. 6, 1988
[86] PCT No.: PCT/EP88/00814
    § 371 Date: May 2, 1990
    § 102(e) Date: May 2, 1990
[87] PCT Pub. No.: WO90/03074
    PCT Pub. Date: Mar. 22, 1990

[51] Int. Cl.⁵ .......................................... H04M 11/00
[52] U.S. Cl. .................................. 379/96; 379/89; 379/375
[58] Field of Search .............. 379/88, 89, 93, 96–98, 379/100, 67, 373, 375

[56] References Cited

U.S. PATENT DOCUMENTS

| | | | |
|---|---|---|---|
| 4,506,111 | 3/1985 | Takenouchi et al. | 379/96 |
| 4,837,798 | 6/1989 | Cohen et al. | 379/88 |
| 4,853,952 | 8/1989 | Jachmann et al. | 379/89 |

FOREIGN PATENT DOCUMENTS

| | | | |
|---|---|---|---|
| 0087849 | 9/1983 | European Pat. Off. | |
| 3221683 | 12/1983 | Fed. Rep. of Germany | 379/89 |
| 3239881 | 4/1984 | Fed. Rep. of Germany | 379/88 |

OTHER PUBLICATIONS

J. R. Lineback, "Personal Computers Are Putting the Squeeze on Digital PABX Voice Mail", Electronics Week, Jun. 10, 1985, pp. 28, 29.

Primary Examiner—James L. Dwyer
Assistant Examiner—Wing F. Chan
Attorney, Agent, or Firm—Barry R. Lipsitz

[57] ABSTRACT

A microprocessor (12) is connected to the elecronic mail system in order to receive the data items which identify the queueing messages and a random access memory (16) is organized to form a file (FIL) containing codes ($u_1, u_2 \ldots u_n$) which identify predetermined addressees of messages and data items ($n_1, n_2 \ldots n_n$) representing the telephone numbers of these addressees. A modem circuit (17) connected to a telephone line (6) is organized to extract the telephone number data items from the said file (FIL) and dial the telephone numbers of the addressees automatically in order to transmit call signals to them on the telephone line. The microprocessor (12) is organized to read the queueing file of the messages received in the electronic mail system in order to detect there the presence of the identification codes ($u_1, u_2 \ldots u_n$) residing in the file (FIL), to extract from the file the telephone number data item corresponding to each identification code detected, and to instruct the modem circuit (17) to dial the corresponding call numbers automatically in order to trigger a call signal on the telephone line (6) for a predetermined time interval.

10 Claims, 2 Drawing Sheets

SYSTEM FOR AUTOMATIC NOTIFICATION OF THE RECEIPT OF MESSAGES IN AN ELECTRONIC MAIL SYSTEM

DESCRIPTION OF PRIOR ART

An electronic mail system such as the IBM DISOSS system (Distributed Office Support System) performs the automatic storage and automatic distribution of messages and documents within a company or an organization. Such a system comprises a central computer with attendant electronic mail software, a screen monitor connected to the computer and several terminals connected to the screen monitor. The arrival of messages or documents in the central computer is signalled by the appearance of a data item in a list of messages and documents received (queueing file). The queueing file is transmitted on a permanent basis to the various terminals and to the screens of the latter, the users can consult the queueing file and request the receipt of a message or consult an identified document. An electronic mail system of this kind renders important services in that it leads in particular to improving the efficiency of the administrative work, improving communication between decision-makers and reducing the space required for the archives. However, such a system does not allow the addressees of messages or documents to be notified of the arrival of these messages and these documents. This is universally recognized to be a disadvantage. The presentation of a message or document necessitates, in fact, the regular if not permanent consultation of the queueing file of the messages received, which can involve delays in the receipt of the messages or the communication of the documents and requires the users to be on virtually permanent stand-by.

SUMMARY OF THE INVENTION

The object of the invention is an automatic electronic system which remedies the disadvantage mentioned above and ensures that the addressees of messages or documents are automatically notified of the arrival of these messages or documents. The characteristic features of the system according to the invention are set out in the attached claims.

A microprocessor is connected to the electronic mail system in order to receive the data items which identify the queueing messages, and a random access memory is organized to form a file containing codes which identify predetermined addressees of messages and data items representing the telephone numbers of these addressees. A modem connected to a telephone line is organized to extract the telephone number data items from the file and dial automatically the telephone numbers of the addressees in order to transmit call signals to them on the telephone line. The microprocessor is organized to read the queueing file of the messages received in the electronic mail system, to detect the presence there of the identification codes residing in the file, to extract from the file the telephone number data item corresponding to each identification code detected, and to instruct the modem to dial automatically the corresponding call numbers in order to trigger a call signal on the telephone line during a predetermined time interval.

The advantages of the system according to the invention are that the addressees of messages or documents received are notified immediately by telephone of the receipt of a message or document intended for them and that the messages and documents can be received more quickly by their addressees without the need for special stand-by. In addition, the addressees can be notified not only locally through an internal telephone network but also long distance through an external telephone network. This system according to the invention can also with advantage replace the use of telex in urgent cases within a group using an electronic mail system. Finally, the hardware and software costs of the system according to the invention are low.

DESCRIPTION OF AN EXEMPLIFYING EMBODIMENT

Figure 1:
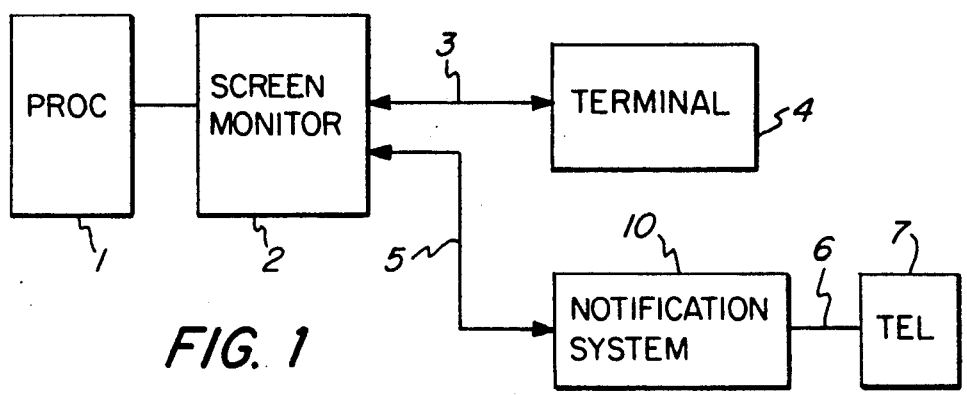
FIG. 1 represents diagrammatically an electronic mail system which incorporates an automatic notification system according to the invention.

In FIG. 1 there is represented diagrammatically an electronic mail system such as the DISOSS system. A system of this kind comprises a central processor or host processor 1, a screen monitor 2 and a set of terminals of which one terminal 4 is shown. The host processor manages the reception and distribution of the messages and documents. The reception of a message or document is signalled by the insertion of a data item in a queueing list or file (QUEUE). This queueing list can be transmitted on the line 3 and displayed on the screen of each terminal 4 at the request of the user. An example of a queueing list is reproduced in Table 1 below.

TABLE 1

| 1<br>QUEUE | 2<br>IDENTIF | 3<br>TYPE | 4 | 5 | 6<br>DATE<br>(M/D) | 7<br>WT<br>(H:M) | 8<br>DATE<br>(M/D) | 9<br>WT<br>(H:M) |
|---|---|---|---|---|---|---|---|---|
| BXLDIS32 | BXLAR5IN | RECP | 4 | 0 | 08/03 | 332:19 | 08/03 | 332:19 |
| BXLDIS32 | BXLPC2EX | RECP | 2 | 0 | 08/05 | 284:13 | 08/05 | 284:13 |
| BXLDIS32 | EPSPC1GS. | RECP | 1 | 0 | 08/16 | 24:46 | 08/16 | 24:46 |

In this example, each heading in the queueing list contains the reference of the list (column 1), the identification code of an addressee (column 2), the type of queueing list (column 3), the number of messages entered for the addressee (column 4), the number of attempted receipts of the messages (column 5), the date and queueing time of the first message entered (columns 6 and 7), the date and queueing time of the oldest message (columns 8 and 9). When a message or document has been received by its addressee, the corresponding heading is up-dated or erased according to whether there still remains a message to be received by the addressee in question or whether the last queueing message or document has been received. In this known system, each user has to consult the queueing file and, in order to do this, to operate the keyboard of his terminal, to know if a message or document is intended for him.

According to the invention, the system described above is advantageously complemented by an automatic notification system 10 designed to notify automatically the addressee of a message or document by telephone as soon as such a message or document is received. The automatic notification system according to the invention is connected on the one hand to the screen monitor 2 by means of a coaxial cable 5 and it is connected on the other to a telephone line 6 which can be linked to a private telephone exchange or to a public telephone network represented by the block 7.

Figure 2:
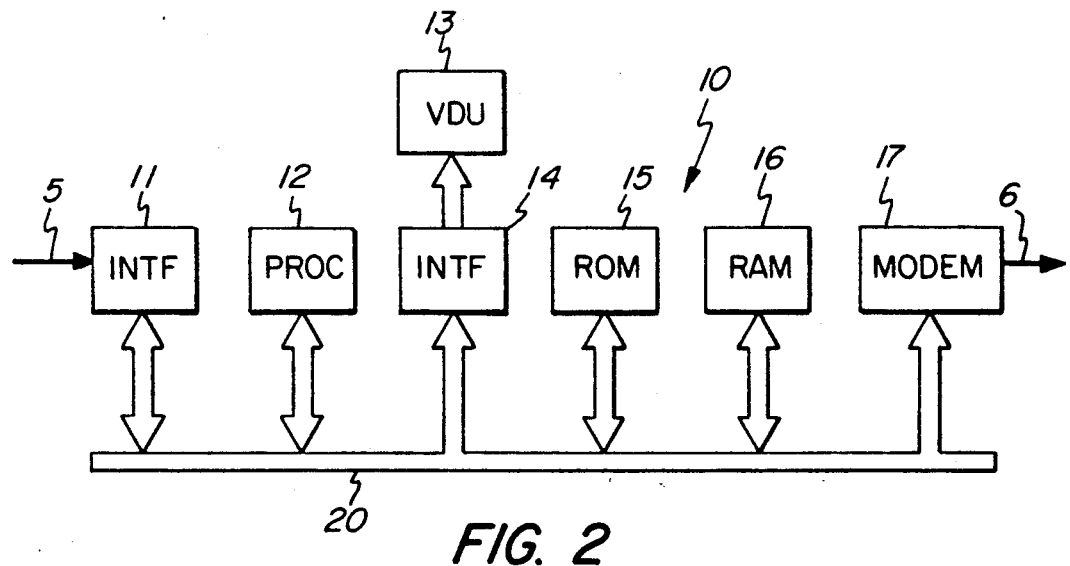
FIG. 2 represents diagrammatically the general architecture of the automatic notification system according to the invention.

The general architecture of the automatic notification system 10 is represented diagrammatically by blocks in FIG. 2. The coaxial cable 5 is connected to a connection circuit 11 which serves as an interface with the bus 20 linking the various organic units of the system to one another. These units are basically a microprocessor 12, a screen monitor 13 with its interface 14, a large-capacity ROM memory 15 for storing the command programs, a random access memory 16 for forming a file as will be seen later, and a modem circuit 17 whose function will be described later.

The microprocessor 12 is a unit well known in itself which can be realised in various modes of execution lying within the normal competence of the skilled man in order to execute various connections and functional tasks under the direction of command signals laid down in an operating program recorded in the ROM 15. The latter has, for example, a capacity of at least 10 MB (megabytes or mega-octets).

According to the invention, a special code is assigned to each addressee for whom automatic notification is required and a notification file FIL is formed in the random access memory 16. The codes of addressees are polled in the order of codes $u_1, u_2 \ldots u_n$. In the file FIL there are recorded the codes $u_1, u_2 \ldots u_n$ identifying the addressees and, for each code, numerical data $n_1, n_2 \ldots n_n$ representing the telephone number of the addressee together with data $t_1, t_2 \ldots t_n$ representing transmission parameters for each telephone call, as will be seen later. The telephone numbers can be extension numbers in an internal network of a group, call numbers of a local telephone zone, or interzonal or long-distance call numbers. The modem 17 is a unit known in itself, which is organized to dial telephone numbers automatically from numerical data and generate signals suitable for transmission on the telephone line 6.

Figure 3:
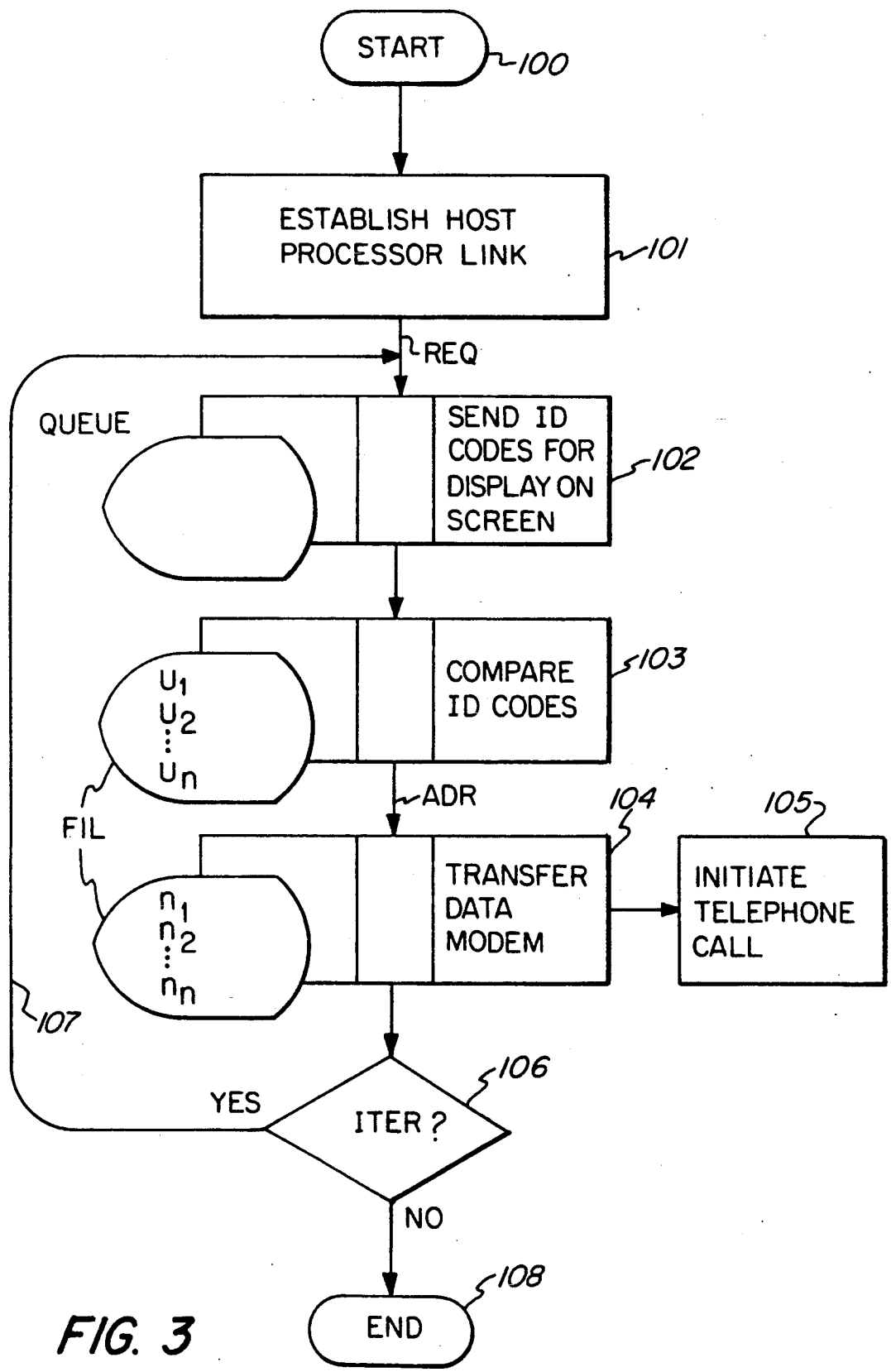
FIG. 3 is a flow-chart of the telephone notification process employed in the system according to the invention.

The automatic notification system according to the invention functions under the control of the microprocessor 12 driven or organized by a command system resident in the memory 15. The functioning of the system according to the invention is illustrated by the flow-chart of FIG. 3.

After start-up of the system (stage 100), the first functioning stage (stage 101) consists in establishing a link with the host processor 1 of the electronic mail system through the cable 5. The microprocessor 12 then activates the sending to the host processor 1 of a request signal REQ demanding presentation of the identification codes of the queueing messages (stage 102). In response to the request signal (REQ), the host processor 1 sends the identification codes of addressees contained in the queueing list QUEUE and the microprocessor 12 activates their display on the monitor screen 13.

The microprocessor 12 then activates reading of the content of the file FIL residing in the memory 16 and comparison of each identification code $u_1, u_2 \ldots u_n$ in the file FIL with the identification codes of the queueing list QUEUE (stage 103). If the latter contains a code corresponding to one of the codes $u_1, u_2 \ldots u_n$ in the file FIL, the microprocessor 12 activates the generation of an address signal ADR in order to address the memory 16 and extract from the file FIL the data items $n_1$ representing the call number of the addressee identified and the parametric data $t_1$ previously mentioned. These data serve to establish the methods or conditions of transmission of the call signals on the telephone line 6. It is possible, for example, to fix the duration of the telephone call, the hours during which the call must be made, the days during which a call can be made, or other possible indications. The microprocessor 12 activates the display of these data items on the monitor screen 13 opposite each identification code. For example, a table of the kind shown in Table 2 below appears on the monitor screen 13.

TABLE 2

| $u_i$ | N | DATE | $t_i$ | $n_i$ |
|---|---|---|---|---|
| BXLPC1DI | 4 | 28/04 | 2:56 | 3280 |
| BXLPC1RE | 2 | 28/04 | 2:56 | 9145 |
| EPSPC10A | 2 | 27/04 | 0:25 | 4302 |

In this specimen table, each heading contains the code $u_1$ of an addressee, the number N of messages or documents received for this addressee, the date of receipt, and the time of receipt $t_1$ (minutes and seconds) of each telephone call, the telephone number $n_1$ of the addressee. The data items $u_1$, $t_1$ and $n_1$, as has been stated above, are extracted from the file FIL according to the invention.

The microprocessor 12 then activates the transfer of the numerical data items $n_1, n_2 \ldots n_n$ to the modem 17 (stage 104) and the modem responds by dialling the telephone number automatically and generating the pulses suitable for transmission on the telephone line 6 (stage 105), according to a process well known in the field of the art.

After a lapse of time corresponding to the parametric items $t_1$ extracted from the file FIL, the microprocessor 12 sends to the modem 17 an interrupt order, in response to which the modem interrupts the transmission of the pulses on the telephone line 6. The same process takes place for each of the identification codes $u_1, u_2 \ldots u_n$ of the file FIL. When all the codes have been scanned (stage 106), the activation process continues (line 107) by repetition of the operations from stage 102 until a final order is received (stage 108). The display on the monitor screen 13 is up-dated automatically at regular adjustable intervals.

By means of the system according to the invention, the addressees of messages or documents received in an electronic mail system are notified immediately by telephone of the receipt of the messages and documents which are addressed to them. These messages and documents can thus be received very quickly by their addressees, which increases advantageously and optimizes the efficiency of the electronic mail system. It should be noted that the addressees of messages and documents can be notified both locally through an internal telephone network and by long-distance telephone communication.

In an exemplifying embodiment, the electronic notification system 10 is composed of a commercially available unit known as a personal computer, for example a PC 3270 unit made by IBM. So that it can communicate, according to the invention, with the screen monitor 2 of the electronic mail system, the personal computer must be fitted with a coaxial connection card, for example the 3270 Adapter interface card made by IBM. In addition, in order that it can convert the numerical data extracted from the memory 16 into signals suitable for transmission on the telephone line 6, the personal computer must be fitted with a modem card, for example a modem card from the company Devlonics Terminals N.V., compatible with the Hayes and CCITT V25bis transmission protocols, which are well known to the skilled man.

The random access memory of the personal computer is used to accommodate the above-mentioned file FIL, and the ROM of the unit is used to store the control system designed to direct the automatic telephone notification system described in the aforegoing. It suffices to recopy onto hard disc, for example, the application control system recorded previously on a diskette.

In this exemplifying embodiment, in which use is made of a personal computer to realize the system according to the invention, the notification system forms an operational link with the equipment of the personal computer through interface softwares, for example: the disk operating system DOS 3.30 for the management of a file and the software API for interfacing with the application software (telephone notification process) in the case of a PC 3270 personal computer. The link between the latter and the electronic mail system can be effected by means of an operational software Workstation Program 1.00. All these interface softwares, as is obvious to the skilled man, are started up prior to the start-up of the telephone notification process according to the invention.

The skilled man will recognise that the invention is in no way limited to the exemplifying embodiment described by way of illustration. Any variant or modification, or any equivalent arrangement, must be regarded as lying within the scope of the invention.

I claim:

1. A system for the automatic notification of the receipt of a message in an electronic mail system, comprising:
    a microprocessor connected to receive data items from the electronic mail system identifying queuing messages;
    a random access memory coupled to said microprocessor and organized to form a first file containing:
    identification codes for predetermined addressees of messages,
    telephone call numbers for said addressees, and
    signalling data fixing a duration for the transmission of telephone signalling pulses for each telephone call number; and
    a modem circuit for connection to a telephone line, said modem circuit being arranged and organized to convert the signalling data residing in said first file into analog signals suitable for transmission on the telephone line;
    said microprocessor being organized to read a queuing file of the messages in the electronic mail system in order to detect the presence of identification codes, extract from said first file the telephone number and signalling data corresponding to each detected identification code, and instruct the modem circuit to automatically dial the extracted telephone numbers and transmit telephone signalling pulses via the telephone line for the signalling duration corresponding to each extracted telephone number.

2. A system according to claim 1 further comprising a monitor screen for displaying the data residing in said queuing file.

3. A system in accordance with claim 1 wherein said telephone line is connected to a private telephone exchange.

4. A system in accordance with claim 1 wherein the telephone line is connected to a public telephone exchange.

5. A system in accordance with claim 1 wherein:
    the functions of said microprocessor are performed by a personal computer fitted with a connection card that interfaces with a monitor screen and a modem card for connection with said telephone line;
    said personal computer including random access memory to accommodate said first file and read only memory to store control software for the automatic notification system.

6. A system in accordance with claim 2 wherein said telephone line is connected to a private telephone exchange.

7. A system in accordance with claim 2 wherein the telephone line is connected to a public telephone exchange.

8. A system in accordance with claim 2 wherein:
    the function of said microprocessor are performed by a personal computer fitted with a connection card that interfaces with a monitor screen and a modem card for connection with said telephone line;
    said personal computer including random access memory to accommodate said first file and read only memory to store control software for the automatic notification system.

9. A system in accordance with claim 3 wherein:
    the functions of said microprocessor are performed by a personal computer fitted with a connection card that interfaces with a monitor screen and a modem card for connection with said telephone line;
    said personal computer including random access memory to accommodate said first file and read only memory to store control software for the automatic notification system.

10. A system in accordance with claim 4 wherein:
    the function of said microprocessor are performed by a personal computer fitted with a connection card that interfaces with a monitor screen and a modem card for connection with said telephone line;
    said personal computer including random access memory to accommodate said first file and read only memory to store control software for the automatic notification system.

* * * * *